Dec. 13, 1955  W. B. PASHKOW  2,726,828
AUTOMATIC BRAKE FOR HOSE REELS
Filed Feb. 11, 1953  3 Sheets-Sheet 1

INVENTOR
William B. Pashkow

BY Jewett, Mead, Browne
& Schuyler
ATTORNEY

Dec. 13, 1955    W. B. PASHKOW    2,726,828
AUTOMATIC BRAKE FOR HOSE REELS
Filed Feb. 11, 1953    3 Sheets-Sheet 2
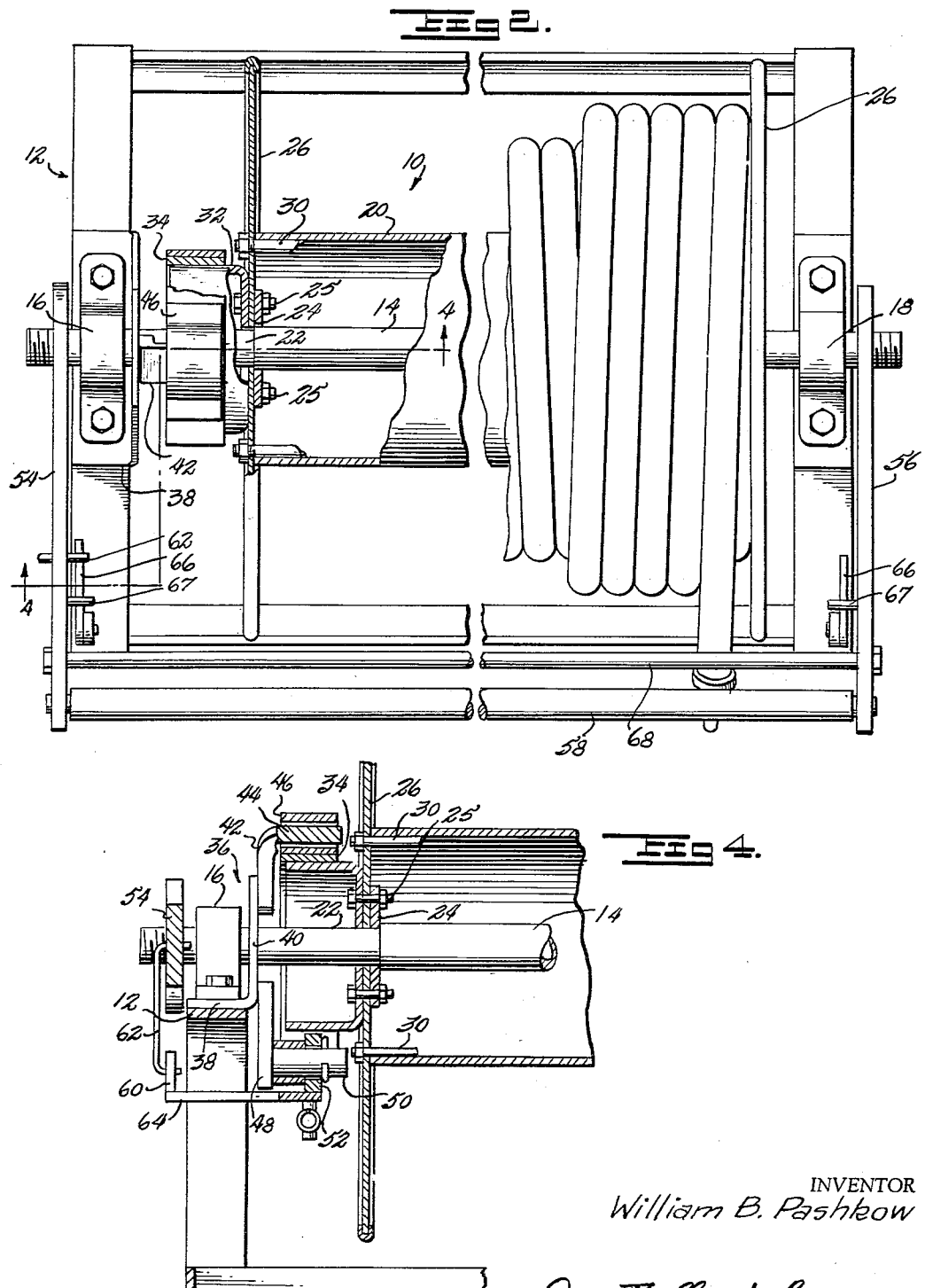
INVENTOR
William B. Pashkow
BY Jewett, Mead, Browne
& Schuyler
ATTORNEY Dec. 13, 1955  W. B. PASHKOW  2,726,828
AUTOMATIC BRAKE FOR HOSE REELS
Filed Feb. 11, 1953  3 Sheets-Sheet 3
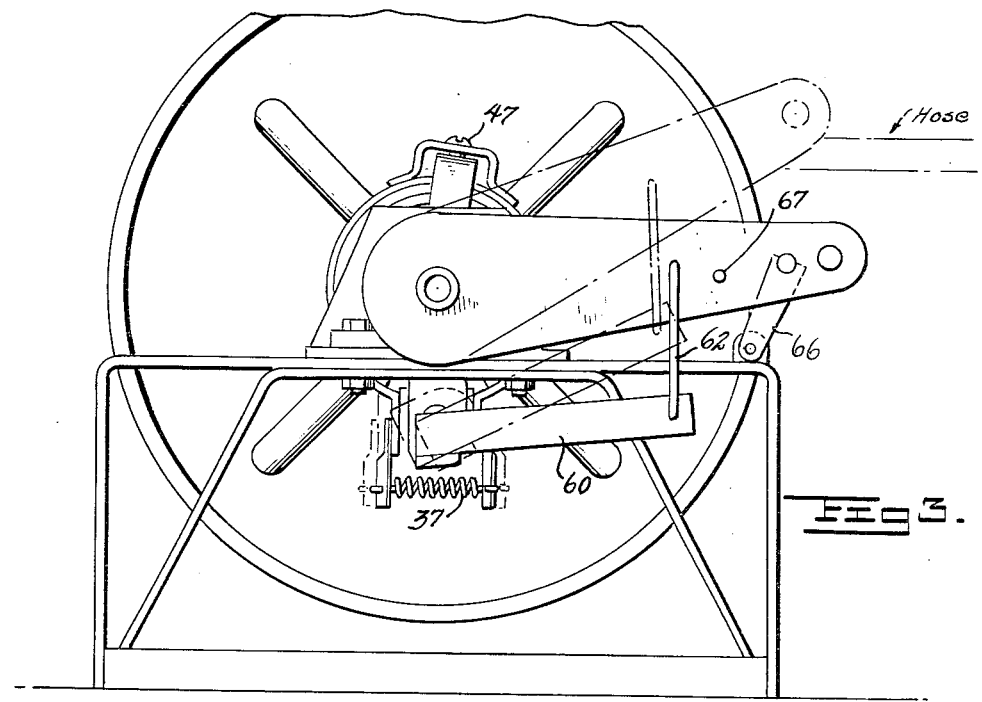
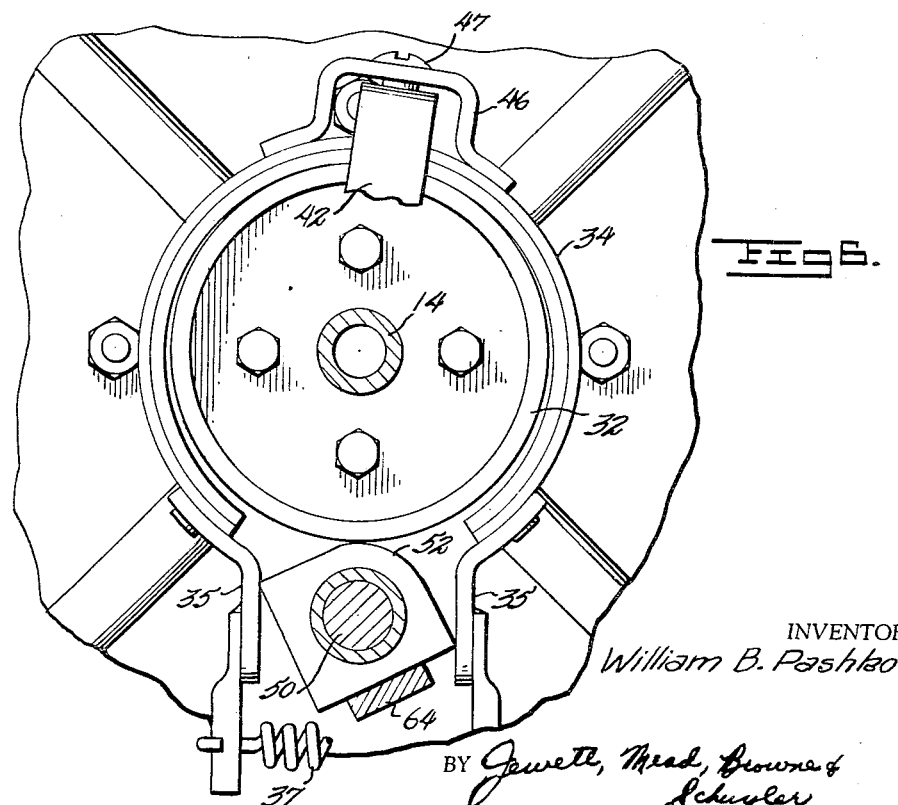
INVENTOR
William B. Pashkow
BY Jewett, Mead, Browne &
Schuyler
ATTORNEY United States Patent Office 2,726,828
Patented Dec. 13, 1955

2,726,828
AUTOMATIC BRAKE FOR HOSE REELS

William B. Pashkow, Teaneck, N. J., assignor to Ward LaFrance Truck Corporation, Elmira, N. Y., a corporation of New York Application February 11, 1953, Serial No. 336,327

5 Claims. (Cl. 242—156)

This invention relates to hose reels of the type used for fire hose, and more particularly to an automatic brake arrangement for such hose reels.

One of the problems encountered in the operation of hose reels, and a problem which is particularly serious in the case of fire hose reels, is the fact that when the hose is pulled rapidly from the reel there is a tendency for the reel to spin rapidly, paying out hose in an uncontrolled manner which frequently causes twisting of the hose. It can readily be appreciated that in the case of fire hose reels this is a serious problem, since in the event of a fire it is desirable that the fire hose unwind from the reel in an orderly manner entirely under the control of the operator.

Accordingly, it is an object of this invention to provide an automatic braking arrangement for hose reels, which has particular utility in connection with fire hose reels, although not necessarily restricted thereto.

It is a further object of this invention to provide an automatic braking arrangement for hose reels which permits the hose to unwind from the reel only when the hose is under tension at the reel.

It is a further object of this invention to provide an automatic braking arrangement for a hose reel which depends for its actuation upon the angle of elevation of the hose at the reel.

It is a further object of this invention to provide a braking system for a hose reel which is automatically actuated in accordance with the tension on the hose through a linkage and cam arrangement which is simple in construction and sure in operation.

In accordance with these objectives, this invention provides a braking arrangement for hose reels in which a brake drum attached to the hose reel is acted upon by a brake band, the brake band being operated by a cam rotated by a linkage system controlled by tension on the hose. In accordance with my invention, the hose reel is locked against rotation when the hose is slack at the reel, but is unlocked whenever there is any tension on the hose.

The features of this invention which I believe to be novel are set forth with particularity in the appended claims. My invention itself, however, both as to its organization and use, together with further objects and advantages thereof, may best be understood by reference to the following description taken in connection with the accompanying drawings in which:

Fig. 2 is a plan view, partially broken away, of the hose reel of Fig. 1;

Fig. 3 is a side elevation of the hose reel of Fig. 1;

Fig. 4 is a vertical section along line 4—4 of Fig. 2;

Fig. 6 is an enlarged detail similar to Fig. 5 showing the brake in unlocked position.

Figure 1:
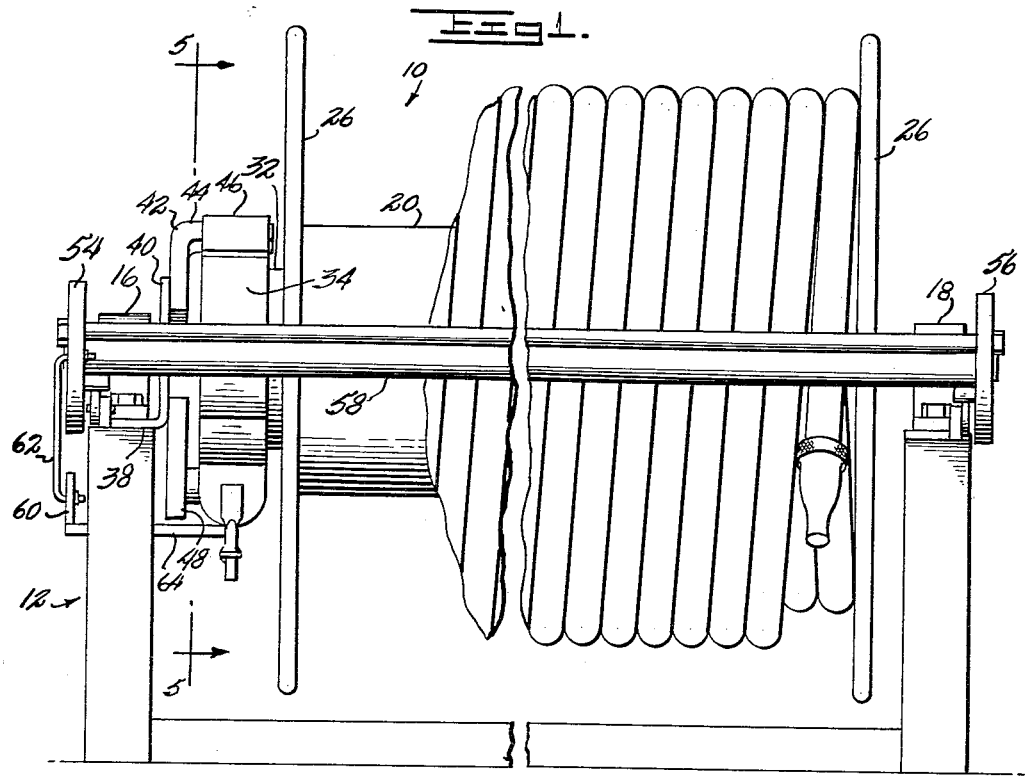
Fig. 1 is a front elevation of a hose reel embodying the braking arrangement of my invention.

Referring now to the drawings, the hose reel, generally designated as 10, is mounted on a supporting framework generally designated as 12. The reel is provided with a rotatable shaft 14 which is supported by bearings 16 and 18 at the opposite ends of the supporting framework 12. Shaft 14 is provided with a reduced portion 22 at each of its opposite ends. A hollow cylindrical drum 20 is fixedly positioned on shaft 14 by means of end plates 24 and end disks 26. End plates 24 are positioned on the reduced portions at each end of shaft 14 in such manner as to abut against the shoulders of the unreduced center portion of the shaft, and end disks 26 at opposite ends of the drum 20 are rigidly secured by bolts 25 to the plates 24 and by the studs 30 to the outer periphery of drum 20.

A brake drum 32 is rigidly secured to the left-hand end of cylindrical drum 20 with respect to the view shown in the drawings, by means of the bolts 25 which pass through the end disk 26 and the end plate 24.

A brake band 34 surrounds the brake drum 32, terminating at its lower portion in two free ends 35 which are biased toward each other by spring 37. A cam 52 is interposed between the ends 35 to permit spreading of the brake band to free the brake drum and reel 10 for rotation, as will be described hereinafter in more detail. Brake band 34 is supported by a mounting bracket assembly generally designated as 36. The mounting bracket 36 may be an integral welded assembly and is provided with a base portion 38, shown in Fig. 4, which is adapted to fit between the bottom surface of the bearing member 16 and the upper surface of the support frame 12, the base portion 38 being held in position by the same bolts which connect the bearing 16 to the supporting structure 12. Integral with the base portion 38 is an upwardly extending vertical portion 40 which is centrally apertured to permit passage therethrough of the reduced end portion 22 of shaft 14. A right angle element 42 is rigidly attached to the upper portion of vertical portion 40, right angle element 42 being provided with a substantially horizontally-extending arm 44 which is adapted to be received by a clip 46 attached to the upper surface of the brake band 34. A bolt 47 or other fastening means may be used to secure arm 44 to clip 46.

Rigidly attached to the lower portion of bracket 36 and extending vertically downwardly therefrom is an arm 48 to which is rigidly attached a laterally projecting pin or stud member 50. A cam 52 is rotatably supported by pin 50, cam 52 being adapted to fit between the downwardly extending ends 35 of brake band 34, as will best be seen in Fig. 6.

In order to actuate cam 52 to spread the ends 35 of brake band 34 in such manner as to release brake drum 32 when there is tension on the hose, a linkage system is provided which will now be described. A pair of arms 54 and 56 are pivotally supported at opposite ends of the shaft 14, arms 54 and 56 extending radially outwardly from shaft 14. A roller 58 connects the outer ends of arms 54 and 56 together. A rod member 68 is connected between the outer ends of arms 54 and 56 slightly radially inwardly of roller 58. Arm 54 is connected intermediate of its length to a lever member 60 by a downwardly extending link 62. Lever 60 is connected to the lower surface of cam 52 by a laterally extending arm 64 which is rigidly attached at one end to lever 60 and at the other end to the lower surface of cam 52.

Stop members 66 are pivotally mounted on the upper edge of the supporting framework 12 on opposite sides thereof. When the edges of stop members 66 are resting on the supporting framework, the stop members serve as an abutment for pins 67 carried by arms 54 and 56 and thereby determine the "rest" position of arms 54 and 56 and roller 58. Stop members 66 may also be swung upwardly about their pivotal connection to hold the arms 54 and 56 in an elevated position should it be desired to render the braking system inoperative, as, for example, when the hose is being rewound. This is accomplished by having rod member 68 engage a notch in the outer ends of the respective stop members 66 when it is desired to render the brake ineffective.

Figure 5:
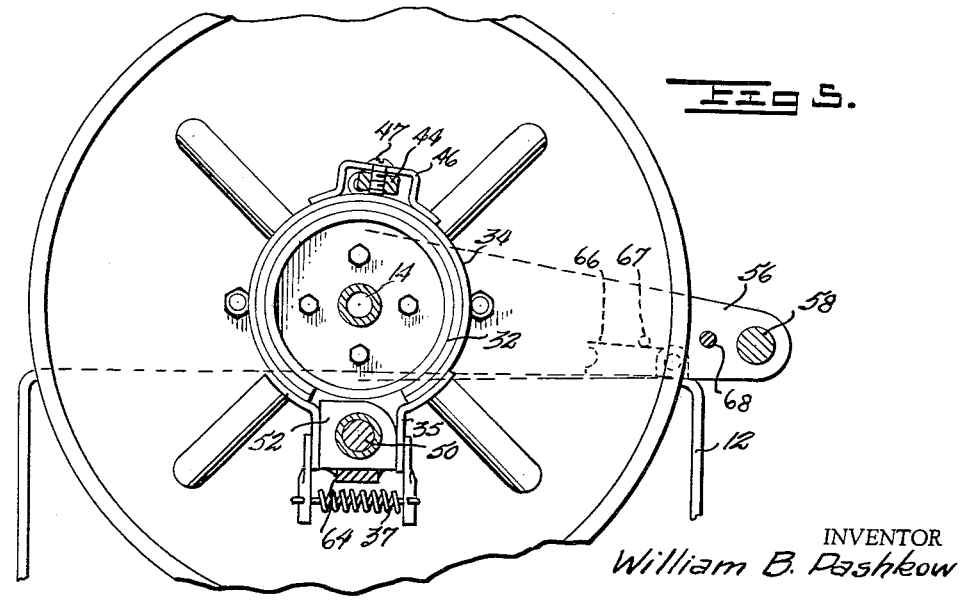
Fig. 5 is a vertical section along line 5—5 of Fig. 1 showing the brake in locked position.

The arms 54 and 56 and their connecting roller have a normal rest position, when the hose is not under tension, such as that shown in Fig. 5, in which the cam 52 is so positioned that the ends 35 of the brake band 34 are contracted and the brake drum 32 is locked against rotation. In the rest position shown in Fig. 5, corresponding to a slack condition of the hose, the arms 54 and 56 are inclined slightly downwardly so that the center line of roller 58 is positioned below the center line of shaft 14. The hose being unwound from the reel is passed underneath roller 58, and whenever there is any tension on the hose at the reel, the angle of elevation of the hose is sufficient to raise the roller 58 to cause unlocking of brake band 35 with respect to brake drum 32.

When arm 54 moves upwardly due to tension on the hose, as shown in dotted outline in Fig. 3, the link 62 moves upwardly, thereby elevating lever 60 which is connected through laterally extending connecting member 64 to pivotally mounted cam 52. This causes the cam 52 to be rotated to a position such as that shown in Fig. 6 in which the ends 35 of the brake band 34 are spread apart against the resistance of spring 37. When the ends of the brake band are spread apart as shown in Fig. 6, the brake band 34 is released from engagement with the brake drum 32 and the reel 10 is permitted to rotate, thereby paying out the hose.

The surface of cam 52 should be shaped so that in the rest position, shown in Fig. 5, the ends of the brake band 34 are contracted, but so that a slight movement of the cam from rest position will spread the ends of the brake band sufficient to unlock the brake drum. Furthermore, the shape of the cam should be such that the brake band will be locked against the brake drum only in the slack position of the hose.

As long as tension is maintained on the hose sufficient to maintain the portion of the hose underneath roller 58 elevated even slightly above the rest position, the arm 54 and the connecting links to the cam 52 will be actuated in such manner as to permit rotary movement of the reel 10. When the hose is being unwound from the reel under tension, it will come off tangent to whatever hose is still on the reel, and even when the angle of inclination of the tensioned hose is downward, the hose will still lift roller 58 to cause unlocking of the brake. However, if the portion of the hose underneath roller 58 is permitted to become slack, with the hose at the reel extending substantially vertically downwardly, then the roller 58 and arms 54 and 56 will drop downwardly to their normal rest position in such manner as to move cam 52 to the position shown in Fig. 5 in which the brake drum 32 is locked by the brake band 34.

If it is desired for some reason to render the braking system ineffective as, for example, when the hose is being rewound, the stop members 66 on the opposite ends of the support structure may be pivotally moved to the position shown in Fig. 3 and rod 68 may be positioned in the notches in the radially outer ends of the respective stop members 66. This maintains roller 58 and arms 54 and 56 in a position sufficiently elevated to release the brake band 34 from engagement with the brake drum 32.

It can be seen from the foregoing that I have provided in accordance with my invention an automatic braking arrangement for use with hose reels which coordinates motion of the hose reel with the requirements for additional lengths of hose. The arrangement of my invention permits unwinding of the hose whenever the hose at the reel is under tension, but locks the reel against rotation whenever the hose at the reel is slack, thereby controlling unwinding of the hose in such manner as to prevent twisting of the hose. It can be appreciated that the automatic braking arrangement of my invention has particular utility in connection with fire hose reels and provides a safeguard against twisting of the fire hose at the time of a fire.

While there has been shown and described a particular embodiment of my invention, it will be obvious to those skilled in the art that various changes and modifications can be made therein without departing from the invention and, therefore, it is aimed in the appended claims to cover all such changes and modifications as fall within the true spirit and scope of the invention.

I claim:

1. In a hose reel mounted for rotation on a support, means for braking the rotation of said reel, said means comprising a brake drum carried by said reel, a brake band surrounding said brake drum and operable thereon, means for releasing said brake band from engagement with said brake drum, and means for operating said releasing means comprising an operating member actuated by movement in a vertical plane of the hose carried by said reel, said operating member being pivotally supported for arcuate movement substantially about the axis of said reel, said brake band being engaged with said brake drum when said hose is untensioned and disengaged from said brake drum when said hose is tensioned.

2. In a hose reel mounted for rotation on a support, means for braking the rotation of said reel, said means comprising a brake drum carried by said reel, a unitary brake band surrounding said brake drum, said brake band terminating in a pair of spaced-apart end portions, cam means disposed between said end portions of said brake band and operable to engage and disengage said brake band with respect to said drum, means for operating said cam comprising an operating member actuated by movement in a vertical plane of the hose carried by said reel, said operating member being spaced from said reel but pivotally mounted for arcuate movement about the axis of said reel, the axis of said member moving to at least the height of the axis of said reel when engaged by the hose, said brake band being engaged with said brake drum when said hose is untensioned and disengaged from said brake drum when said hose is tensioned.

3. In a hose reel mounted for rotation on a support, a brake drum carried by said reel, a brake band surrounding said brake drum and operable thereon, said brake band terminating in a pair of spaced apart free ends, a spring for normally drawing said ends together to cause said brake band to engage said brake drum, a cam disposed between said ends for disengaging said brake band from said brake drum, and means for moving said cam to cause said brake band to be disengaged from said brake drum, said means comprising an operating member engageable with the hose and actuatable by the draw-off motion of said hose, said operating member being mounted for pivotal motion about an axis substantially coinciding with the axis of said reel, link means connecting said member and said cam to effect operation of said brake band, said cam means permitting said brake band to engage said brake drum when said hose is untensioned but disengaging said brake band from said brake drum when said hose is tensioned.

4. In a hose reel mounted for rotation on a support, a brake drum carried by said reel, a unitary brake band surrounding said brake drum and operable thereon, said brake band terminating in a pair of spaced apart free ends, a spring for normally drawing said ends together to cause said brake band to engage said brake drum, a bracket member attached to said support member in substantially axial alignment with said brake drum and adjacent thereto, support means for said brake band extending from said bracket and attached to said brake band, a stud member attached to said bracket and extending axially toward said brake band, a cam mounted for rotation on said stud, said cam being disposed between said free ends for disengaging said brake band from said brake drum, and means for moving said cam, said means comprising a pivotally mounted member engageable with the hose and actuatable by the draw-off motion of said hose, and link means connecting said member and said cam to effect operation of said brake band.

5. A hose reel as defined in claim 4 comprising a pair of radially extending arms pivotally supported adjacent opposite ends of said reel for arcuate movement about the axis of said reel, said pivotally mounted member being attached to the outer ends of said arms, a first link member pivotally attached to one of said arms at an intermediate portion of the length of said one arm, a second link member connected to said cam, said first and second link members being connected to each other to transmit motion of said pivotally mounted member to said cam.

References Cited in the file of this patent

UNITED STATES PATENTS

| 2,199,603 | Ackley | May 7, 1940 |
| 2,488,492 | Dumbleton | Nov. 15, 1949 |
| 2,562,990 | Peebles | Aug. 7, 1951 |

FOREIGN PATENTS

| 502,826 | Belgium | May 15, 1951 |
| 622,525 | Great Britain | May 3, 1949 |